United States Patent
Maghsoodi et al.

(10) Patent No.: US 9,988,249 B2
(45) Date of Patent: Jun. 5, 2018

(54) CLUTCH FOR A WINCH OR HOIST

(71) Applicant: Goodrich Corporation, Charlotte, NC (US)

(72) Inventors: Bejan Maghsoodi, Diamond Bar, CA (US); Stephen Davies, Shropshire (GB); Steven D. Mahnken, Long Beach, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 461 days.

(21) Appl. No.: 14/715,962

(22) Filed: May 19, 2015

(65) Prior Publication Data
US 2016/0340159 A1 Nov. 24, 2016

(51) Int. Cl.
| B66D 1/14 | (2006.01) |
| F16D 7/02 | (2006.01) |
| F16D 43/21 | (2006.01) |
| F16D 43/22 | (2006.01) |
| B66D 1/12 | (2006.01) |

(Continued)

(52) U.S. Cl.
CPC .............. B66D 1/14 (2013.01); B66D 1/12 (2013.01); F16D 7/027 (2013.01); F16D 13/46 (2013.01); F16D 13/75 (2013.01); F16D 43/216 (2013.01); F16D 43/22 (2013.01); F16D 2023/123 (2013.01)

(58) Field of Classification Search
CPC ... B66D 1/14; B66D 1/12; F16C 7/027; F16C 13/46; F16C 13/75; F16C 43/216; F16C 43/22; F16C 2023/123
See application file for complete search history.

(56) References Cited

U.S. PATENT DOCUMENTS

| 1,538,923 A | * | 5/1925 | Bolger | ..................... B66D 1/14 254/328 |
| 3,038,576 A | * | 6/1962 | Simpson | .................. B66D 1/14 192/150 |

(Continued)

FOREIGN PATENT DOCUMENTS

| GB | 990410 A | 4/1965 |
| GB | 2089000 A | 6/1982 |
| JP | S5761831 A | 4/1982 |

OTHER PUBLICATIONS

European Search Report for Application No. 16170432.5-1751, dated Oct. 19, 2016, 7 Pages.

*Primary Examiner* — Emmanuel M Marcelo
*Assistant Examiner* — Michael E Gallion
(74) *Attorney, Agent, or Firm* — Cantor Colburn LLP

(57) ABSTRACT

A clutch comprises an input shaft, an output shaft and a biasing member. The biasing member is arranged to provide a biasing force that allows torque transfer from the input shaft to the output shaft via one or more input friction plates and one or more output friction plates. Rotation of the output shaft may cause the biasing force to vary to adjust the maximum torque setting of the clutch during reeling-in or reeling-out of a winch cable around a winch drum. A retainer may be included in the clutch which retains the biasing member in operative connection with the output shaft and translates axially relative to the input shaft upon rotation of the output shaft. The axial translation may cause the biasing force to vary by varying the compression of the biasing member.

11 Claims, 5 Drawing Sheets

(51) Int. Cl.
*F16D 13/46* (2006.01)
*F16D 13/75* (2006.01)
*F16D 23/12* (2006.01)

(56) References Cited

U.S. PATENT DOCUMENTS

| | | | | |
|---|---|---|---|---|
| 3,511,349 | A * | 5/1970 | Herscovici Saul | F16D 43/286 192/56.31 |
| 4,426,064 | A * | 1/1984 | Healy | B66D 1/14 254/342 |
| 4,624,650 | A * | 11/1986 | Hiruma | F16D 3/14 192/70.12 |
| RE33,303 | E | 8/1990 | Denman et al. | |
| 5,277,288 | A * | 1/1994 | Barnum | F16D 7/048 192/56.1 |
| 6,874,606 | B1 * | 4/2005 | Heidenreich | F16D 7/027 192/104 F |
| 7,128,193 | B2 * | 10/2006 | Murakami | F16D 7/08 192/48.8 |
| 7,837,179 | B2 | 11/2010 | Steiner, Jr. et al. | |
| 2003/0029688 | A1 * | 2/2003 | Lovatt | F16D 7/027 192/56.6 |
| 2009/0301836 | A1 * | 12/2009 | Murakami | F16D 7/027 192/56.62 |
| 2013/0306424 | A1 * | 11/2013 | Kaminaga | F16D 21/06 192/48.1 |
| 2016/0340158 | A1 * | 11/2016 | Maghsoodi | F16D 13/46 |
| 2016/0340159 | A1 * | 11/2016 | Maghsoodi | B66D 1/12 |
| 2016/0341259 | A1 * | 11/2016 | Maghsoodi | F16D 13/38 |
| 2017/0276182 | A1 * | 9/2017 | Davies | F16D 3/06 |

\* cited by examiner

CLUTCH FOR A WINCH OR HOIST

TECHNICAL FIELD

The present disclosure relates to a clutch for a winch, a winch system and a method of adjusting a clutch torque setting.

BACKGROUND

When using a winch (or hoist) to raise a payload, a winch cable is attached to a motor-driven drum at one end and the payload at the other. The motor is driven to rotate the drum in order to gather up the winch cable on the outer circumference of the drum. As the cable is laid onto the drum, the drum radius is effectively increased, due to the extra radius provided by the build-up of layers of cable laid thereon. The increasing radius increases the torque necessary to lift the payload, due to moment effects. In a modern hoist or winch system, a clutch is provided to limit the torque applied to the drum. Unfortunately, in the event of the aforementioned effective drum radius increase, the extra torque required must be somehow accommodated by the clutch, which traditionally only has a fixed setting (i.e. a maximum torque before it slips), set by the friction between the clutch plates. As the cable is reeled-in with a fixed line load, the torque generated may be too great, causing the clutch to slip. This could lead to the drum free-wheeling and the dropping of the payload.

SUMMARY

It is the aim of the present disclosure to overcome the aforementioned disadvantages by providing a clutch for a winch that allows the clutch setting to be varied as the winch cable winds up or down (is reeled-in or out), to account for the torque variation due to the variation in effective drum radius. An auxiliary system to moderate for torque variation due to friction-based variations may also be used in the clutch.

It will be appreciated by one skilled in the art that "winch" or "hoist" refer to the same apparatus, and for the purposes of this disclosure, the terms may be used interchangeably. Only a winch shall be referred to in the description, however, in accordance with the above, any reference to a winch could equally refer to a hoist.

From one aspect, the present disclosure provides a clutch for driving a winch. The clutch comprises an input shaft, an output shaft and a biasing member. The input shaft is configured for connection to a motor and is operatively connected to at least one input friction plate for rotation therewith. The output shaft is configured for driving a winch and is operatively connected to at least one output friction plate for rotation therewith. The biasing member is arranged to provide a biasing force that pushes the at least one input friction plate and the at least one output friction plate into contact with each other so that torque can be transferred from the input shaft to the output shaft via the input and output friction plates. Rotation of the output shaft causes the biasing force to vary.

In accordance with an embodiment of this aspect, the clutch may further comprise a retainer for retaining the biasing member in operative connection with the output shaft. Rotation of the output shaft causes the retainer to translate axially relative to the input shaft. The axial translation of the retainer causes the biasing force to vary.

From another aspect, the present disclosure provides another clutch for driving a winch. The clutch comprises an input shaft, an output shaft, a biasing member and a retainer. The input shaft is configured for connection to a motor and is operatively connected to at least one input friction plate for rotation therewith. The output shaft is configured for driving a winch and is operatively connected to at least one output friction plate for rotation therewith. The biasing member is arranged to provide a biasing force that pushes the at least one input friction plate and the at least one output friction plate into contact with each other so that torque can be transferred from the input shaft to the output shaft via the input and output friction plates. The retainer is configured to retain the biasing member in operative connection with the output shaft and to translate axially relative to the input shaft upon rotation of the output shaft. The axial translation of the retainer causes the biasing force to vary.

Reference to translation "axially" relative to a rotatable shaft should be understood to refer to translation (i.e. movement) along a direction substantially parallel or aligned with the rotational axis of that shaft.

The varying biasing force provided by the above aspects means that the frictional engagement of the input and output friction plates varies and, as such, the torque setting at which the plates slip relative to each other also varies. In use, the clutch may be configured so that rotating the output shaft in the direction that causes a connected drum to gather a winch cable (and thus retrieve a load), causes the biasing force to increase. The result of this is that the maximum torque that can be transmitted by the clutch (before the friction plates slip) is increased. This may prevent the extra torque caused by the effective radius increase of the drum causing the clutch to prematurely slip. In addition, allowing the biasing force to decrease whilst the drum reels out the winch cable (setting down a load) ensures that the clutch torque setting decreases appropriately for the given load and effective drum radius. This ensures the clutch will slip before a harmful load is allowed to pass through the clutch and possibly be transmitted to the structure to which the winch is attached.

In accordance with any of the above aspects or embodiments thereof, the retainer may comprise a retaining flange.

In accordance with any of the above aspects or embodiments, the biasing member may comprise one or more disc springs positioned around the output shaft. For example, there may be three or more disc springs.

In accordance with any of the above aspects or embodiments, the axial translation of the retainer may cause the compression of the biasing member or disc springs to be varied. Compressing the spring(s) may increase the biasing force provided.

Alternatively, other biasing members could be used such as an elastomeric block or a hydraulic arrangement.

In accordance with any of the above aspects or embodiments, the retainer may be operatively connected to the output shaft such that it is rotatable relative to the output shaft (i.e. the rotation of the retainer is not tied to the rotation of the output shaft).

The retainer may also be operatively connected to the output shaft such that it is axially translatable relative to the output shaft (i.e. it can move axially relative to the output shaft).

The clutch may further comprise a toothed output flange extending radially outward from the output shaft, a toothed portion extending radially outward from the retainer, and an idler gear disposed radially outward of the retainer and the output flange. The idler gear may be in spur-meshed engagement with both the output flange and the retainer.

The idler gear may have two separate engagement portions for engagement with the output flange and the retainer, respectively. Alternatively, a single engagement portion may engage both the toothed output flange and the toothed portion of the retainer.

A gear ratio may be provided between the output flange and the retainer.

The output flange and retainer may have a different number of teeth.

The retainer may further comprise a first threaded portion on an inner radial surface thereof and the output shaft may further comprise a second threaded portion on an outer radial surface thereof. The first and second threaded portions may be co-operatively engaged. The second threaded portion of the output shaft may act as a lead screw to drive the axial translation of the retainer relative to the output shaft.

Alternatively, the retainer may be operatively connected to the output shaft such that it translates axially and rotates therewith (i.e. so that it cannot rotate or move axially relative to the output shaft).

In this embodiment, the clutch may further comprise an auxiliary shaft arranged to be rotationally driven by the output shaft. Rotation of the auxiliary shaft relative to the output shaft may cause the output shaft to translate axially relative to the auxiliary shaft and the input shaft.

The auxiliary shaft and the output shaft may be linked by a gearing arrangement that is configured to create the relative rotation therebetween.

At least a portion of the auxiliary shaft may be positioned radially inside the output shaft.

The output shaft and the auxiliary shaft may co-operate via engagement between a threaded portion on a radially inner surface of the output shaft and a threaded portion on a radially outer surface of the auxiliary shaft. The threaded portion of the auxiliary shaft may act as a lead screw to drive the axial translation of the output shaft relative to the auxiliary shaft.

The clutch of any of the above described embodiments and aspects may further comprise one or more ball-ramp assemblies positioned between the input shaft and the at least one input friction plate. It should be understood that there may be intervening members between the ball-ramp assembly or assemblies and that input shaft and the input friction plate(s) respectively. In other words, the ball-ramp assembly is not necessarily directly connected to the input shaft and the input friction plate(s).

From a further aspect, the present disclosure provides a winch system comprising a clutch (as described in any of the preceding aspects or embodiments), a motor operatively connected to the input shaft and a drum operatively connected to the output shaft.

As discussed above, the winch system may further comprise a cable secured to the drum. Rotating the output shaft in a first direction may cause the cable to be reeled-in around the drum and cause the biasing force to be increased. Rotating the output shaft in a second direction may cause the cable to be reeled-out from the drum and cause the biasing force to be decreased.

The biasing force may be increased by rotation of the output shaft in the first direction causing movement of the retainer and/or the output shaft in a first axial direction. The biasing force may be decreased by rotation of the output shaft in the second direction causing movement of the retainer and/or the output shaft in a second axial direction.

From a yet further aspect, the present disclosure provides a method of adjusting a clutch torque setting comprising the step of using the clutch of any of the embodiments and aspects described above. The disclosed method allows the clutch torque setting to be adjusted in order to compensate for moment effects from an increase or decrease in the effective drum radius.

It is to be understood that for the purposes of this disclosure "effective drum radius" is defined as the radius of a winch drum combined with the width of the winch cable layers wound thereon. A winch cable layer is formed when the entire circumferential width of the drum has been covered with winds of cable and the cable must be laid over the top of the existing cable in order to be reeled on to the drum.

It is to be understood that for the purposes of this disclosure "spur-meshed engagement" describes the engagement of one gear with another between respective toothed portions of the two gears.

It is to be understood that for the purposes of this disclosure, any "connections" between first and second parts may be direct or indirect, unless otherwise specified. An indirect connection between first and second parts may comprise one or more intervening members.

BRIEF DESCRIPTION OF THE DRAWINGS

Exemplary embodiments and features of the present disclosure will now be described by way of example only, and with reference to FIGS. 1 to 3c, of which:

FIG. 2b is an enlarged view of a portion of the clutch of FIG. 2a;

FIG. 3b is an enlarged view of a portion of the clutch of FIG. 3a;

DETAILED DESCRIPTION

Figure 1:
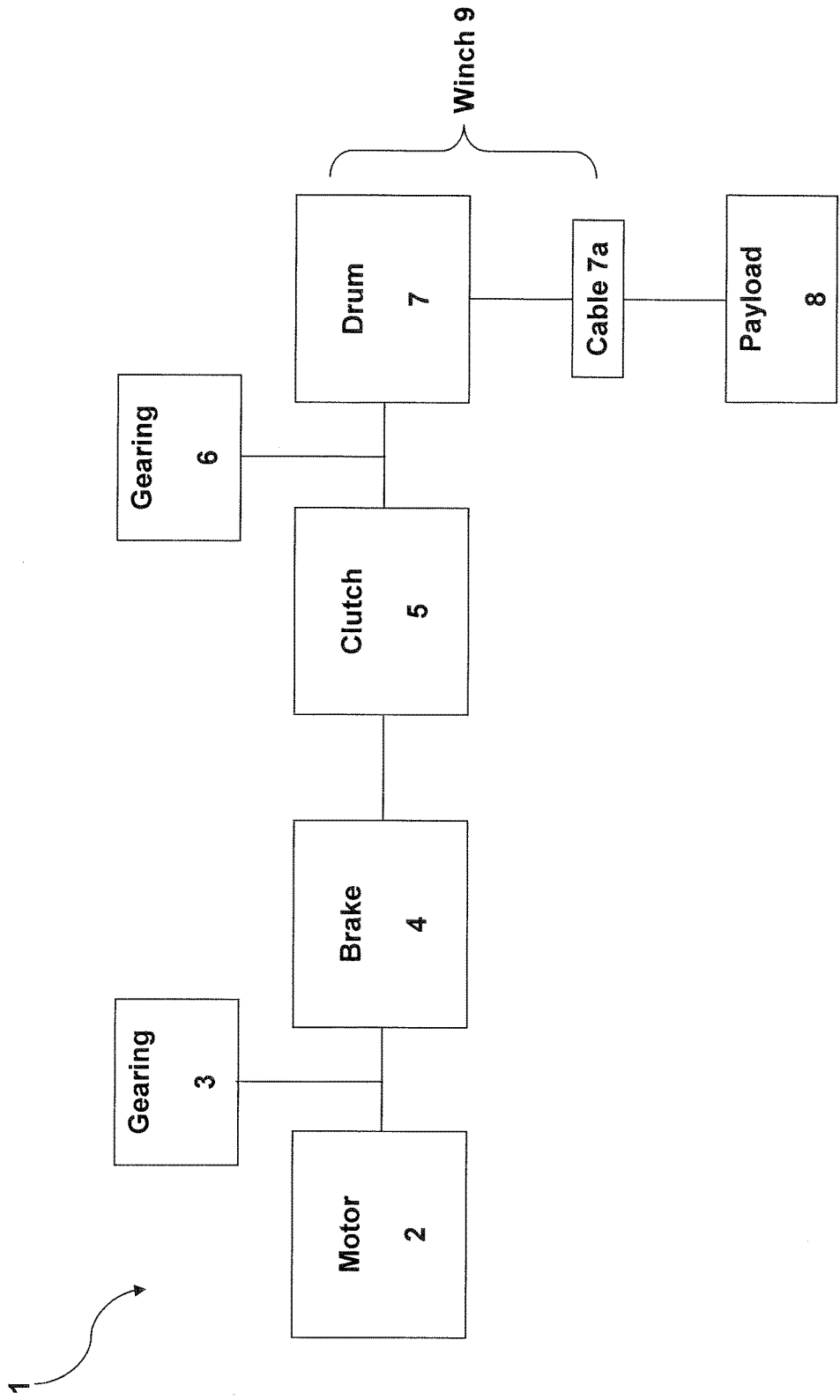
FIG. 1 is an overview of a winch system, in accordance with the present disclosure.

FIG. 1 shows an overview of a typical winch system 1, as is known in the art. A driving means, such as a motor 2, is operatively connected to a brake 4 through gearing 3, which is operatively connected to a clutch 5, which is operatively connected to a drum 7 through gearing 6. The motor 2 is activated to provide drive to the drum 7 through the gearing 3, brake 4, clutch 5 and gearing 6, in order to reel in (or out) a winch cable 7a to lift (or drop) a payload 8. The drum 7 and cable 7a together form a winch 9. The brake 4 is provided as a means to stop cable winding without disengaging motor 1, whereas clutch 5 acts as a moderating means for the drive, allowing the drum 7 to be disconnected from the motor 2 should the drum 7 become overloaded.

Figure 2A:
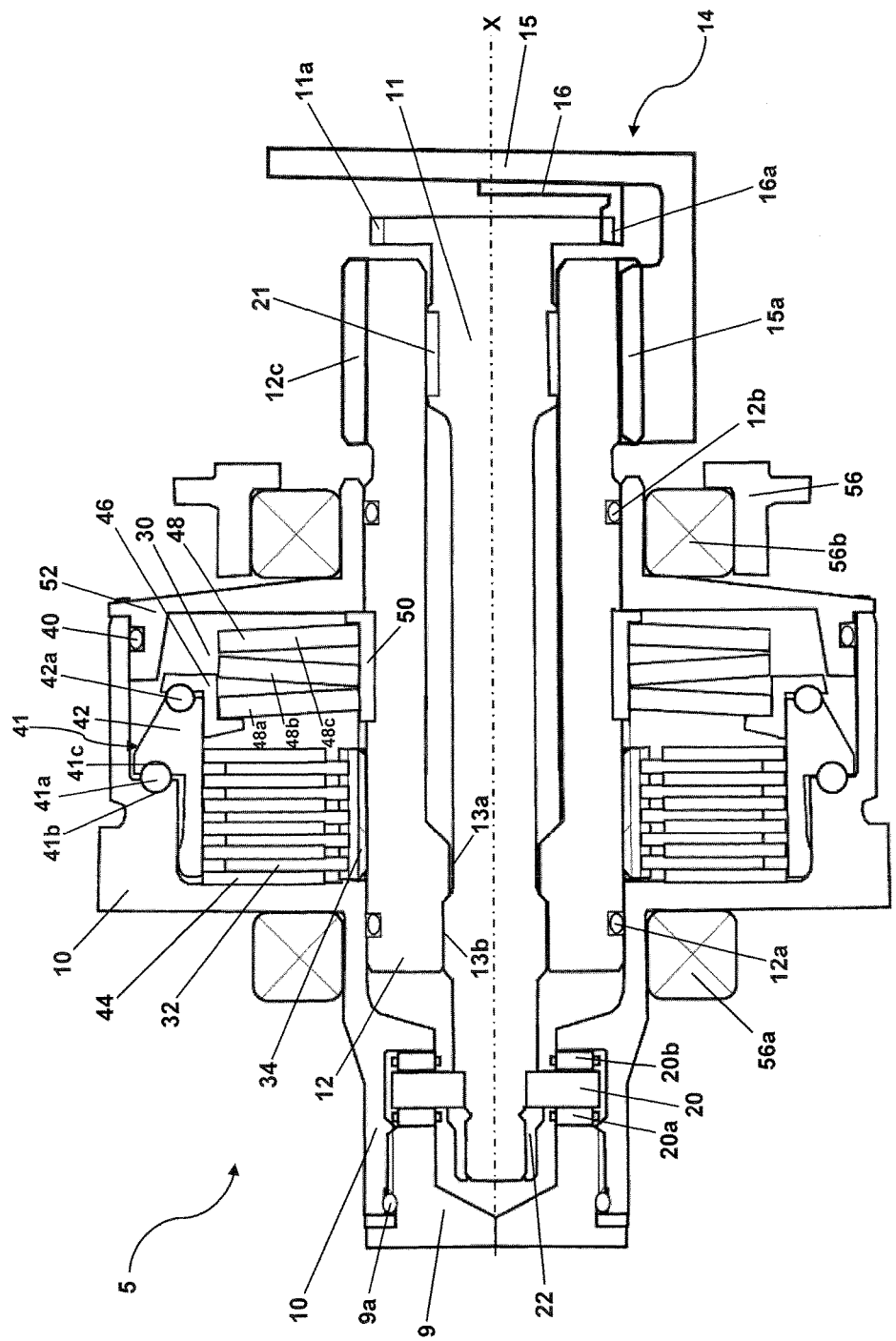
FIG. 2a is a cross-section of a clutch, in accordance with one embodiment of the present disclosure, when the drum is at a minimum effective radius.

FIG. 2a shows a cross-section of one exemplary embodiment of a clutch 5 in accordance with this disclosure. The clutch 5 is shown at the condition when the drum 7 is at minimum effective radius (i.e. there is no cable wrapped around the drum). As shown, the clutch 5 comprises an input shaft 10 connected to a drive shaft 9, which in use would be connected to the motor 2 (not shown) and is rotatable about axis X. The clutch 5 also comprises an output shaft 12 arranged co-axially with the input shaft 10 and rotatable about axis X.

Bearings 56a and 56b support input shaft 10 and are attached to bracket 56, which holds the clutch 5 in place within the apparatus on which it is installed, such as a vehicle, for example an aircraft, such as a helicopter (not shown). It should be understood, however, that the winch could be used other than on a vehicle, for example on a crane (whether stationary or mobile) or on a building.

A seal 9a is used to seal the connection between the drive shaft 9 and the input shaft 10. The clutch 5 is used to selectively transfer the rotation (drive) of the input shaft 10 to the output shaft 12.

Input friction plates 44 are operatively connected to the input shaft 10 via a ball-ramp assembly 41, and intervening output friction plates 32 attached to an output flange 34, which is attached to output shaft 12 for rotating therewith. While this embodiment uses six input friction plates and five output friction plates, any suitable number of each plate could be used.

Although output flange 34 is rotatable with output shaft 12, it is slideable relative to output shaft 12 in the axial direction (i.e. parallel to axis X). Input friction plates 44 are attached to ball-ramp flange 42 of ball-ramp assembly 41. Ball-ramp assembly 41 is operatively connected to input shaft 10 via balls 41a, which are held in a recess 41c at one end of flange 42 and a recess 41b in input shaft 10.

The clutch 5 further comprises a biasing member in the form of spring pack 48 comprising three disc springs 48a, 48b, 48c, also known as Belleville springs or washers. The spring pack 48 is connected to the output shaft 12 via spring pack retaining flange 50, such that the spring pack 48 and the spring pack retaining flange 50 rotate with the output shaft 12 (about axis X). The spring pack 48 is in mechanical communication with a connecting arm 46 via a plurality of ball bearings 42a, so that it can rotate relative to the ball ramp flange 42. Bearing 42a is located in recesses in flange 42 and the connecting arm 46.

As will be understood by one skilled in the art, clutch 5 allows rotation of the input shaft 10 to be transferred to the output shaft 12 via spring loaded engagement of the input friction plates 44 with the output friction plates 32. The maximum permitted amount of torque transferred from the input shaft 10 to the output shaft 12, and vice versa, can be controlled by adjusting the degree of spring loading. This changes the degree of frictional engagement between output friction plates 32 and input friction plates 44.

The input shaft 10 is secured to an input housing piece 52. A seal is formed between the housing piece 52 and the input shaft 10, and the housing piece 52 and the output shaft 12, by ring-seals 40 and 12b, respectively. There is an additional ring-seal 12a disposed between the output shaft 12 and input shaft 10, to ensure that the friction plate cavity 30 is sealed from the surroundings. This is advantageous, as the clutch 5 of the present disclosure may be of a "wet-type" that is desirably immersed in a fluid, such as oil. Such wet-type clutches have advantages such as better lubrication and/or heat management, as would be apparent to one skilled in the art. It is to be understood, however, that the present disclosure is equally applicable to a "dry-type" clutch, and the use of a wet-type clutch in this description is exemplary only.

The function of ball-ramp assembly 41 will now be described in detail. While only two balls 41a are shown, it should be understood that more than 2 balls (and corresponding recesses) may be used.

It is known that during operation of a clutch, such as the described clutch 5, the friction properties of friction plates 32, 44 can vary greatly during use and over the operational life of the clutch 5. This friction property variation can cause unacceptable variations in the maximum permitted torque transfer between input shaft 10 and output shaft 12, and may lead to the clutch slipping too easily or not easily enough.

Ball-ramp assembly 41 is used to moderate and minimise the torque setting variation encountered when operating the clutch 5, by adjusting the force with which the input plates 44 are pressed upon output plates 32. As described above, ball 41a engages the input shaft 10 and the ball-ramp flange 42 in opposing recesses 41b, 41c therein. As is known in the art, such as disclosed in U.S. Pat. No. 3,511,349, the recesses are shaped to act as cam members that cams the ball 41a to increase or decrease the separation between the pairs of recesses 41b, 41c that hold each ball 41a in place.

As the friction characteristics of the friction plates 32, 44 vary, the force exerted by the input friction plates 44 on the output friction plates 32 varies. If the coefficient of friction between the input and output friction plates 32, 44 increases, the maximum torque able to be transmitted through the clutch 5 before slipping will also increase. However, as the torque transmitted through the clutch 5 increases, the separating force between the recesses (41a, 41b) will increase and thus, the friction between friction plates 32, 44 will decrease. As such, the maximum transmitted torque before slipping will subsequently decrease. As will be understood by one skilled in the art, the ball-ramp assembly 41 therefore counteracts the effects of friction variations at the friction plates 32, 44, and thus minimises them to retain the torque slipping thresholds of the clutch 5. This provides an advantage over clutches not having a ball-ramp assembly.

The clutch 5 further comprises a centre (or 'auxiliary') shaft 11 that is rotatably mounted in a co-axial arrangement radially within output shaft 12 using a thrust bearing 20 and a bearing 21 therebetween. Thrust bearing 20 comprises bearing races 20a, 20b. Centre shaft 11 is fixed in axial position by the thrust bearing 20 and a locking nut 22. A portion 13a of the inner surface of output shaft 12 and a portion 13b of the outer surface of the centre shaft 11 are co-operatively threaded to allow axial movement of the output shaft 12 relative to centre shaft 11 when the shafts 11, 12 rotate relative to each other. The portions 13a, 13b may comprise an Acme thread, or any other suitable thread style. The portions 13a, 13b are of a fixed length, to provide a fixed maximum amount of axial translation, and the pitch of the threads (i.e. the distance between adjacent threads) is calibrated to provide a desired amount of axial movement per turn of the output shaft 12 relative to centre shaft 11. Portion 13b may act as a lead screw to translate output shaft 12 axially. As shown, output shaft 12 and centre shaft 11 are operatively connected to clutch output gear assembly 14, comprising clutch output gear 15 and a smaller differential gear 16. Differential gear 16 is attached to output gear 15 such that both gears 15, 16 rotate in unison. Output shaft 12 and centre shaft 11 have external teeth 12c, 11a, formed on their free ends. The teeth 12c, 11a engage output gear 15 and differential gear 16, respectively, by spur meshing with teeth 15a, 16a on each respective gear 15, 16 (not shown). The clutch output gear assembly 14 allows output shaft 12 to output drive to the drum 7 to wind-up an attached winch cable 7a, as is known in the art. An additional function of the clutch output gear assembly 14 is to drive axial movement of the output shaft 12, relative to centre shaft 11, by introducing a gear ratio between differential gear 16 and output gear 15.

Differential gear 16 has a different number of teeth to the output gear 15. In this specific example, differential gear 16 has fewer teeth than output gear 15 which results in a gear reduction from output gear 15 to differential gear 16, as will be understood by one skilled in the art. As such, when the clutch output gear assembly 14 is driven by clutch 5, the rotation speed of output shaft 12 will be greater than that of centre shaft 11. This rotational speed differential will cause a relative rotation between the two shafts, which in turn, causes output shaft 12 to translate axially, as outlined above. The gear ratio can be chosen, along with the thread length and pitch of portions 13a, 13b, to provide the desired degree of axial translation per turn of shaft 11, as would be understood by one skilled in the art.

It is to be understood that this embodiment is exemplary only, and differential gear 16 could equally be provided with more teeth than output gear 15 to provide the desired gear ratio. Furthermore, the desired gear ratio could be achieved by any other suitable method, as would be understood by one skilled in the art, for instance, the number of teeth on the shafts 11, 12 could be different to each other.

As explained above, the spring pack 48 is connected to the output shaft 12 by the retaining flange 50, such that the spring pack 48 and output shaft 12 rotate together. In addition, retaining flange 50 is connected to output flange 12 such that it translates axially therewith too. Thus, when output shaft 12 is translated axially so is spring pack 48. This translation will compress spring pack 48 against connecting arm 46, which in turn, will be pushed against flange 42. Pushing against flange 42 causes input friction plates 44 to engage the output friction plates 32 more tightly (the output friction plates 32 are mounted to move axially with output shaft 12). As the drum 7 winds-up, the gear assembly 14 will cause a progressive increase in the axial translation of output shaft 12. This progressively increases the engagement force between input and output friction plates 32, 44, which accounts for the extra torque required to lift or pull-in the payload due to the increasing effective radius of the drum, as discussed above. This prevents the clutch 5 from slipping prematurely when the cable 7a is wound up.

Figure 2B:
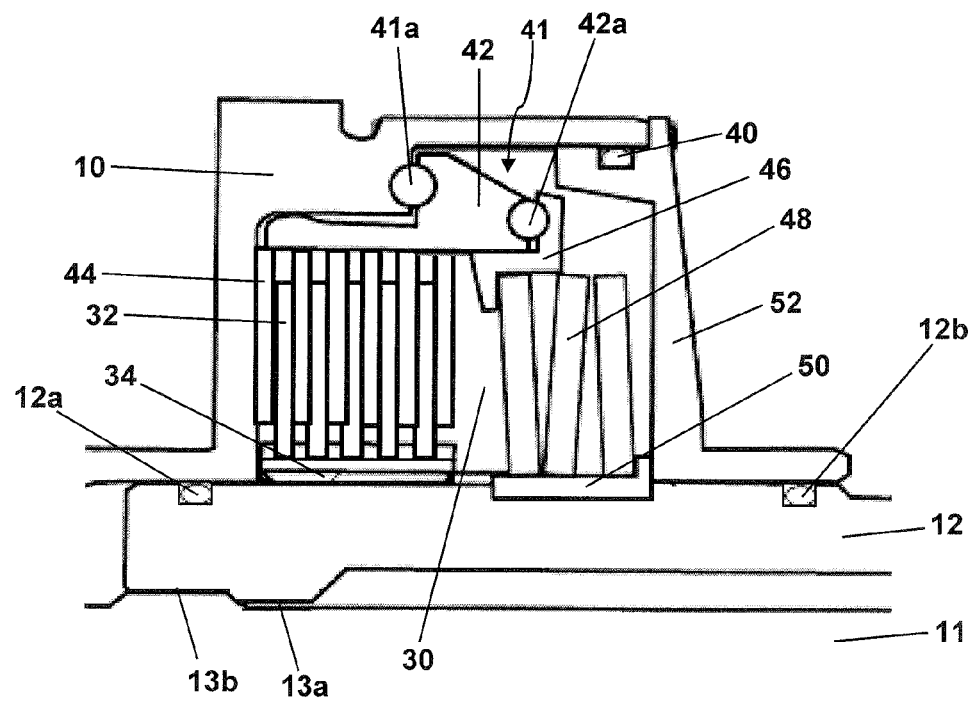
Figure 2C:
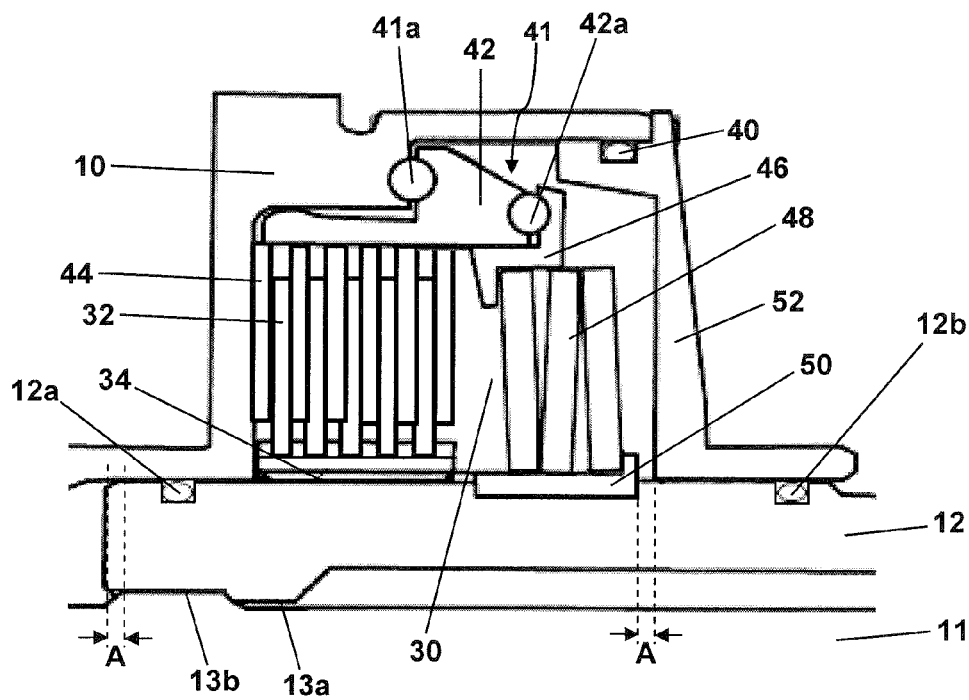
FIG. 2c is an enlarged view of a portion of the clutch of FIG. 2a when the drum is at a maximum effective radius.

For illustration purposes, a comparison of FIGS. 2b and 2c shows the maximum axial translation A of output shaft 12 available and its corresponding effect on spring pack 48.

Figure 3A:
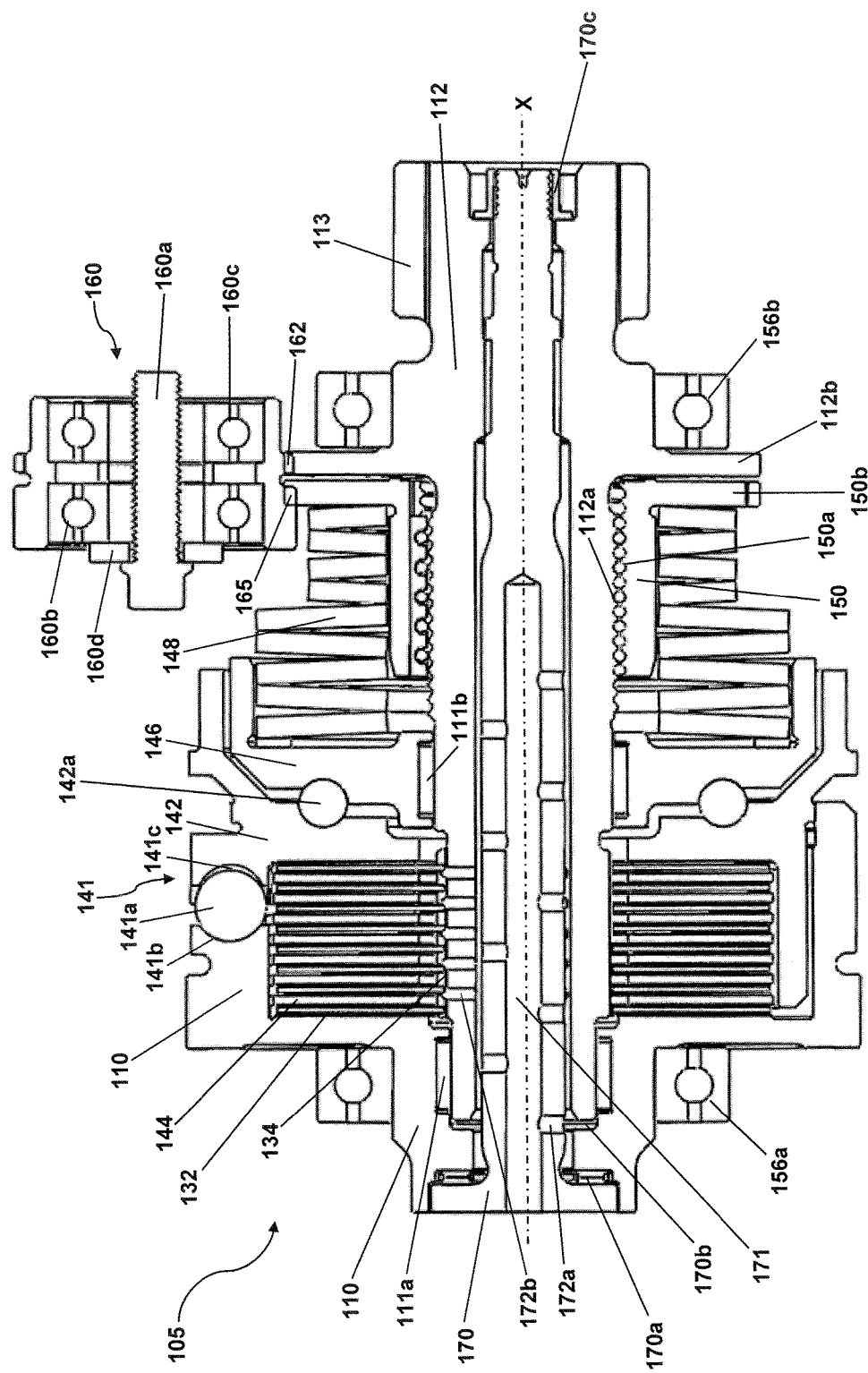
FIG. 3a is a cross-section of a clutch, in accordance with another embodiment of the present disclosure, when the drum is at a minimum effective radius.

FIG. 3a shows a cross-section of another exemplary embodiment of a clutch 105 in accordance with this disclosure. Clutch 105 is also shown at the condition when the drum 7 is at minimum effective radius (i.e. there is no cable wrapped around the drum). Clutch 105 comprises an input shaft 110 connected to motor 2 (not shown) and rotatable about axis X. Clutch 105 also comprises an output shaft 112 arranged co-axially with the input shaft 110 and rotatable about axis X. Output shaft 112 is supported in place by a roller bearing 111a disposed between its outer surface and an inner surface of input shaft 110. The roller bearing allows input shaft 110 and output shaft 112 to rotate relative to each other. Output shaft 112 further comprises an output gear 113 at an output end thereof, in order to facilitate transfer of drive to the winch drum 7 (not shown).

Bearing 156a supports the input shaft 110 and bearing 156b supports the output shaft 112. Bearings 156a, 156b may be attached to a support structure (not shown) to hold the clutch 105 in place on the apparatus on which it is installed. As with the previous embodiment, it may be installed on a vehicle, for example an aircraft, such as a helicopter, or may be installed on a something other than a vehicle, for example a crane (whether stationary or mobile) or on a building.

The clutch 105 is used to selectively transfer the rotation (drive) of the input shaft 110 to the output shaft 112.

Input friction plates 144 are operatively connected to the input shaft 110 via a ball-ramp assembly 141, and intervening output friction plates 132 attached to an output flange 134, which is fixedly attached to output shaft 112 for rotating therewith.

Input friction plates 144 are attached to ball-ramp flange 142 of ball-ramp assembly 141. Ball-ramp assembly 141 is operatively connected to input shaft 110 via balls 141a, which are held in a recess 141c at one end of flange 142 and a recess 141b in input shaft 110.

In the illustrated embodiment, clutch 105 is a wet-type clutch and further comprises an inner shaft 170 fitted co-axially inside output shaft 112. Inner shaft 170 is secured to the output shaft 112 via snap ring 170b and locking nut 170c. Inner shaft 170 is further supported by roller bearing 170a disposed between the input shaft 110 and the outer surface of the chamber 170. Inner shaft 170 further comprises a central bore 171 along a portion of the axial extent thereof and delivery channels 172a through a radial width thereof. Delivery channels 172a are in fluid communication with delivery channels 172b in the output shaft 112. The delivery channels 172a, 172b allow delivery of a fluid (e.g. hydraulic fluid, oil, lubricants and/or coolants) to the friction plate region of the clutch for cooling and/or lubrication, as already discussed above in relation to wet-type clutches. As with the previous embodiment, wet-type clutch 105 is only exemplary and clutch 105 may be instead be a dry-type clutch. If clutch 105 were to be a dry-type clutch, inner shaft 170 and its associated features would simply be absent from the clutch 105.

Clutch 105 further comprises a spring pack 148 comprising disc springs (i.e. Belleville springs or washers). In this particular embodiment, the disc springs are co-axial with the output shaft 112 and centred around the output shaft 112. The spring pack 148 is held in place via a spring pack retaining flange 150. Retaining flange 150 includes a thread 150a on an inner surface thereof, which is configured to co-operatively engage with a thread 112a on the outer surface of output shaft 112. The threads maybe acme threads or any other suitable thread type. The spring pack 148 and the spring pack retaining flange 150 rotate with the output shaft 112 (about axis X). The spring pack 148 is in mechanical communication with a connecting arm 146 and a plurality of ball bearings 142a, so that it can rotate relative to the ball ramp flange 142. The connecting arm is supported around output shaft 112 by a roller bearing 111b. Bearing 142a is located in recesses in the flange 142 and the connecting arm 146. Spring pack 148 is fixed to retaining flange 150, such that it exerts a spring bias on connecting arm 146.

As with the previously described embodiment, clutch 105 allows rotation of the input shaft 110 to be transferred to the output shaft 112 via spring loaded engagement of the input friction plates 144 with the output friction plates 132, and the maximum permitted amount of torque transferred from the input shaft 110 to the output shaft 112, and vice versa, can be controlled by adjusting the degree of spring loading.

As illustrated, clutch 105 includes a ball-ramp assembly, operable in the same manner as the ball-ramp assembly discussed in relation to the previous embodiment. It is to be understood, however, that clutch 105 need not include a ball-ramp assembly. For instance, the input shaft may further comprise an input plate flange that is operatively connected to the input friction plates and is biased directly by the spring pack, rather than through a ball-ramp assembly, as illustrated.

In the previously described embodiment, axial translation of spring pack 48 was achieved by differential rotation of threadably engaged co-axial shafts. In the present, alternative embodiment, axial translation of spring pack 148 is achieved via a different method.

Output shaft 112 further comprises a toothed flange 112b extending radially outward from output shaft 112. In addition, spring pack retaining flange 150 further comprises a toothed portion 150b extending radially outward therefrom. A toothed idler gear 160 is disposed radially outward of retaining flange 150 and output shaft flange 112b. Idler gear 160 is comprised of a central supporting bolt 160a and bearings 160b, 160c which support toothed engagement portions 165 and 162. A washer 160d is used to space the head of bolt 160a from bearings 160b, 160c. The threaded end of bolt 160a may be used to attach idler gear 160 to a supporting structure within the clutch 105 or winch assembly (not shown). Engagement portions 165 and 162 are configured to be in spur-meshed engagement with the toothed portion of the spring pack retaining flange 150b and the output shaft flange 112b, respectively. Engagement portions 165 and 162 may be part of the same gear or provided on separate gears.

As the winch cable 7a is reeled in and drive is transmitted from motor 2 through clutch 105, rotation of output shaft 112 and flange 112b will rotate the idler gear 160 and transmit drive to the spring pack retaining flange 150 via toothed portion 150b. In a similar way to the differential gears of the previous embodiment, flange 112b has a different number of teeth to that of portion 150b. Therefore output shaft 112 and spring pack retaining flange 150 will rotate at different speeds. The threaded engagement between threads 112a and 150a is configured such that differential rotation of output shaft 112 and spring pack retaining flange 150 causes the spring pack retaining flange 150 to be translated axially towards connecting arm 146, via rotation around thread 112a (which acts as a lead screw). The axial translation of spring pack retaining flange 150 closer to connecting arm 146 compresses the spring pack 148 and thus exerts greater spring bias on the input friction plates 144. By exerting greater spring bias on the input friction plates 144 the maximum torque tolerance of clutch 105 is increased, which compensates for the increasing moment effect due to the increasing effective drum radius during reeling in of cable 7a, as previously discussed.

In this particular embodiment, engagement portions 162 and 165 have identical numbers of teeth and toothed portion 150b has fewer teeth than flange 112b. This introduces a reduction gear ratio between flange 112 and portion 150b. This allows retaining flange 150 to rotate around thread 112a via the engagement of thread 150a therewith. As will be appreciated by one skilled in the art, the thread pitch and differential number of teeth between portion 150b and flange 112b can be calibrated to provide a desired amount of axial translation per rotation of output shaft 112. This provides a progressive increase in spring bias to match the progressive increase in effective drum radius, as cable 7a is reeled in. It will also provide a matching progressive decrease in spring bias to match the progressive decrease in effective drum radius as cable 7a is reeled out).

It should be appreciated that within the scope of this disclosure, a gear ratio may be imparted by any suitable method, as would be understood by one skilled in the art. For instance, in another embodiment, flange 112b and portion 150b may have the same number of teeth, and portions 162 and 165 of idler gear 160 may have different numbers of teeth to provide the gear ratio between portion 150b and flange 112b. In a further embodiment, portions 162 and 165 could have a different number of teeth and portion 150b and flange 112b could have a different number of teeth also.

Figure 3B:
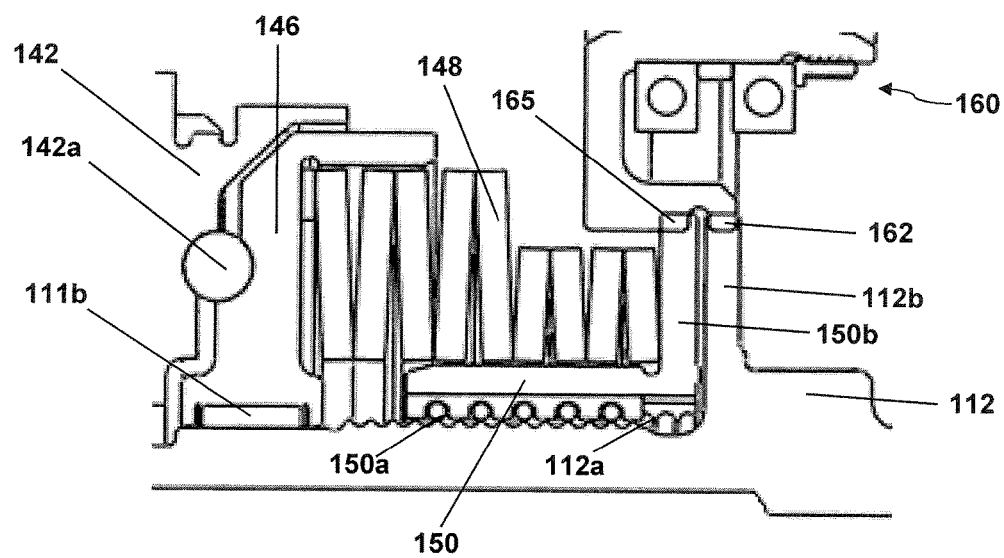
Figure 3C:
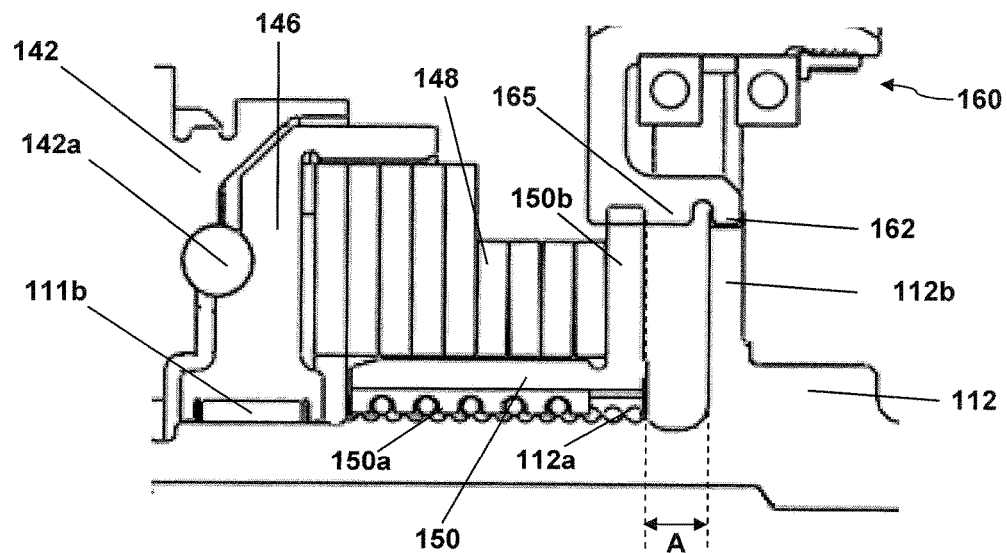
FIG. 3c is an enlarged view of a portion of the clutch of FIG. 3a when the drum is at a maximum effective radius.

For illustration purposes, a comparison of FIGS. 3b and 3c shows the maximum axial translation A of spring pack retaining flange 150 available, and its corresponding effect on spring pack 148.

It is to be appreciated that the ball-ramp mechanism illustrated in FIGS. 2a and 3a is an optional feature, and these embodiments need not include a ball-ramp assembly at all. For instance, the input shaft may further comprise an input plate flange that is operatively connected to the input friction plates and is biased directly by the spring pack, rather than through a ball-ramp assembly, as illustrated. Such a clutch may be less complex and less expensive than one including a ball-ramp assembly.

The ball-ramp assembly provides a separate and additional mechanism to the axial translation of the retaining means. The axial translation of the retaining means varies spring pack compression to compensate for the variation in drum effective radius during reeling in/reeling out, which is the primary objective of this invention. The ball-ramp mechanism may compensate additionally for frictional variances within the clutch at the friction plates. The combination of the two in the same clutch, such as in the illustrated exemplary embodiments in FIGS. 2a and 3a, may provide a particularly advantageous clutch with further reduced torque setting variation, compared to a clutch with an axial translation feature alone. The ball-ramp mechanism is not, however, essential to the present disclosure.

Although the figures and the accompanying description describe particular embodiments, it is to be understood that the scope of this disclosure is not to be limited to such specific embodiments, and is, instead, to be determined by the scope of the following claims.

The invention claimed is:
1. A clutch for driving a winch, the clutch comprising:
an input shaft for connection to a motor and being operatively connected to at least one input friction plate for rotation therewith;
an output shaft for driving a winch and being operatively connected to at least one output friction plate for rotation therewith;
a biasing member arranged to provide a biasing force that pushes the at least one input friction plate and the at least one output friction plate into contact with each other so that torque can be transferred from the input shaft to the output shaft via the input and output friction plates, wherein rotation of the output shaft causes the biasing force to vary;
a retainer for retaining the biasing member in operative connection with the output shaft, wherein rotation of the output shaft causes the retainer to translate axially relative to the input shaft, the axial translation causing the biasing force to vary, wherein the retainer is operatively connected to the output shaft such that it is rotatable and axially translatable relative to the output shaft;
a toothed output flange extending radially outward from the output shaft;
a toothed portion extending radially outward from the retainer; and an idler gear disposed radially outward of the retainer and the output flange, wherein the idler gear is in spur-meshed engagement with both the output flange and the retainer.

2. The clutch of claim 1, wherein the retainer comprises a retaining flange.

3. The clutch of claim 1, wherein the biasing member comprises one or more disc springs positioned around the output shaft.

4. The clutch claim 1, wherein the axial translation of the retainer causes the compression of the biasing member to be varied.

5. The clutch of claim 1, wherein the idler gear has first and second engagement portions for engagement with the output flange and retainer, respectively.

6. The clutch of claim 1, wherein a gear ratio is provided between the output flange and the retainer.

7. The clutch of claim 6, wherein the output flange and retainer have a different number of teeth.

8. The clutch of claim 6, wherein the retainer further comprises a first threaded portion on an inner radial surface thereof, the output shaft further comprises a second threaded portion on an outer radial surface thereof, the first and second threaded portions are co-operatively engaged, and the second threaded portion acts as a lead screw to drive the axial translation of the retainer relative to the output shaft.

9. A winch system, comprising:
a clutch as claimed in claim 1;
a motor operatively connected to the input shaft; and
a drum operatively connected to the output shaft.

10. The winch system of claim 9, further comprising a cable secured to the drum, wherein rotating the output shaft in a first direction causes the cable to be reeled-in around the drum and causes the biasing force to be increased, and rotating the output shaft in a second direction causes the cable to be reeled-out off the drum and causes the biasing force to be decreased.

11. A method of adjusting a clutch torque setting comprising the step of using the clutch of claim 1 to compensate for moment effects from an increase or decrease in the effective drum radius.

\* \* \* \* \*